United States Patent Office 3,449,745
Patented June 10, 1969

3,449,745
SYNTHETIC BEAM SHARPENING SYSTEM
Arthur P. Holt, Jr., Marietta, Ga., assignor to Lockheed Aircraft Corporation, Los Angeles, Calif.
Filed Jan. 15, 1965, Ser. No. 427,209
Int. Cl. G01s 9/56, 9/02
U.S. Cl. 343—6.5                        4 Claims This invention relates in general to a system for producing a synthetically sharpened microwave beam and in particular to a synthetic beam sharpening system for use with an interrogator-transponder system.

Interrogator-transponder systems generally are used to enable an identification of a vehicle to be made at a point remote from the vehicle. Such systems, also known as identification-friend-or-foe (IFF) systems, frequently are utilized in conjunction with a radar system used for the detection of airplanes or other moving vehicles. Generally speaking, when the operator wishes to ascertain the identity of a particular vehicle, he will cause to be transmitted by the interrogator unit an interrogation signal comprising a series of pulses having a definite predetermined time relationship. On board the vehicle being interrogated there may be a unit called a transponder. The transponder, which includes a receiver and transmitter, receives the pulses transmitted by the interrogator; if the quantity and time relationship of these pulses correspond to a pattern preset into the transponder, the transponder transmitter will transmit a reply pulse. This reply pulse, when received by the interrogator, serves to notify the operator that the vehicle being interrogated is of known identity. Additionally, the amount of time that elapses between transmission of the interrogation pulse and reception of the response pulse gives the operator an indication of the distance between the interrogator and the vehicle containing the transponder.

It is evident that if a number of vehicles equipped with transponder units receives the interrogation pulse at the same time, there may be transmitted a number of response pulses. Such plural response pulses render difficult or impossible the identification of the response from the particular vehicle that the operator wishes to interrogate. Furthermore, such multiple response may render ineffective automatic tracking equipment or other apparatus intended to function automatically upon the reception of a desired signal.

In an attempt at overcoming the above difficulty, the interrogation pulses commonly are transmitted with a directional antenna. As is known to those skilled in the art, the degree of directivity of an antenna or the "sharpness" of the beam produced by the antenna generally is a function of the physical size of the antenna. Even though IFF systems typically operate in the UHF region, e.g., about 1,000 megacycles, the physical size of an antenna even approaching the desired beam sharpness can be so great as to render the antenna impractical for some purposes. For example, an antenna having a beam width of one degree at a frequency of 1,030 megacycles would require an aperture of approximately sixty feet. Placing such an antenna in an airborne installation involves enormous mechanical and aerodynamical problems, especially since the antenna must rotate to provide azimuthal coverage.

Furthermore, even highly directional antennas generally do not produce a beam consisting of only a single narrow lobe pointing in the desired direction; rather, such antennas generally produce a signal consisting of a major lobe of relatively strong intensity and a plurality of minor lobes or side lobes of relatively lesser intensity and in a different direction relative to the major lobe. Even though the maximum intensity of such side lobes may be much less than the maximum intensity of the main lobe, the intensity of the side lobes may nonetheless be sufficiently great to cause a transponder unit to produce a pulse in response to an interrogation pulse, even though the major lobe of the antenna is pointing in a direction different from that of the vehicle containing the transponder.

Solutions to the problem of unwanted response signals have been proposed. One such proposal requires the use of an omnidirectional antenna in addition to the directional antenna. A second transmitter is connected to the omnidirectional antenna and this transmitter is keyed by the interrogator transmitter to produce a pulse of reduced power relative to the first interrogation pulse a short time after the first interrogation pulse is produced. The signal strength radiated from the omnidirectional antenna thus is made to be substantially less than the maximum signal strength radiated from the directional antenna so that a transponder equipped to differentiate between the signal strength of the successive pulses will be responsive only to pulses transmitted by the major lobe of the directional antenna and not by the side lobes thereof. Of course, a transponder unit not so equipped will not provide such selective response. Furthermore, this proposed solution does not actually cause sharpening of the major lobe of the directional antenna, the sharpness of this lobe still being a function of antenna design.

Another proposed solution to this problem also requires the use of an additional transmitter at the interrogating location. This second transmitter is connected to an antenna having an output waveform consisting of a null corresponding in azimuthal location to the major lobe of the main interrogating antenna, and relatively high side lobes on either side of the null. An auxiliary pulse transmitted by this second transmitter renders appropriately equipped IFF transponders not situated within the null incapable of responding for a period of time sufficient to prevent spurious pulse responses. This system also has the disadvantage that transponders not equipped in accordance with the system will be responsive not only to interrogation pulses on the major lobe but also to interrogation pulses contained on side lobes.

It has been learned that the problems associated with obtaining a sufficiently sharp interrogating beam and eliminating the effect of false responses resulting from minor lobes of the antenna output are substantially reduced through the provision of an interrogation system in which a pair of beams, each having a major lobe, is propagated so that the beams overlap one another to a certain extent. Interrogating pulses are sent out on these two beams in such a way that only transponders situated within the area of beam overlap can be actuated into transmitting a response pulse.

Accordingly, it is an object of this invention to provide an improved antenna beam sharpening system.

Another object of this invention is to provide an improved electronic interrogation system.

Still another object of this invention is to provide an antenna beam sharpening system wherein an effective beam of the desired sharpness is obtained with an antenna of relatively small physical size.

A further object of this invention is to provide an antenna beam sharpening system having an effective beam width of improved sharpness.

Yet another object of this invention is to provide an electronic interrogation system wherein spurious or unwanted responses due to side lobes of or insufficient sharpness of the interrogation beam are minimized.

A still further object of this invention is to provide an electronic interrogation system that is compatible with existing transponder units without requiring modification thereof.

Another object of this invention is to provide an electronic interrogation system in which side lobe suppression is accomplished without resort to auxiliary interrogation pulses.

The exact nature of this invention as well as other objects and advantages thereof will be readily apparent from consideration of the following specification relating to the annexed drawing in which.

Figures 1, 2:
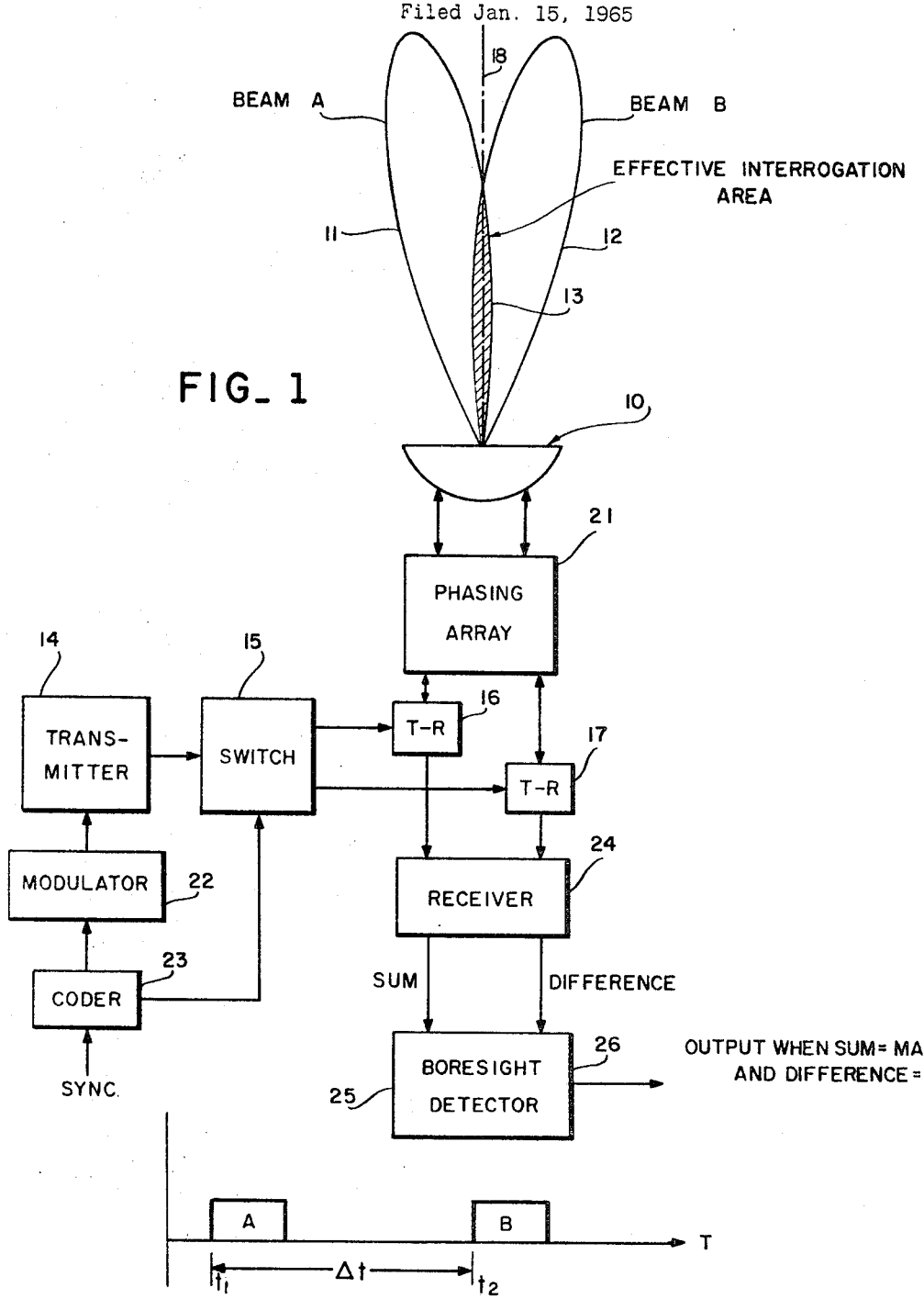
FIGURE 1 shows a block diagram of an embodiment of this invention.
FIGURE 2 shows a typical interrogation pulse set.

Stated generally, the embodiment of the invention disclosed herein includes the use of a pair of overlapping beams for transmission of the multi-pulse interrogation signal. At least one pulse of the interrogation signal will be transmitted on one beam only, while at least another pulse of the interrogation signal will be transmitted on the other beam only. Only those vehicles located within the area of overlap of the two beams will be able to receive all pulses of the interrogation signal, and so only the transponders on such vehicles can respond to the interrogation signal. Additional narrowing of the response of the interrogation system is accomplished through the use of monopulse summing and differencing techniques applied to the response signal as received at the interrogating location to achieve boresight detection of response signals.

More specifically, and with reference to FIGURE 1 of the drawing, there is shown in block diagram an embodiment of a beam sharpening system according to this invention. This system includes an R–F radiator, indicated generally at 10, capable of radiating a pair of R–F beams. One of these beams, designated beam A, has a major lobe 11 angularly displaced a certain amount to the left of boresight 18 of radiator 10. The other of these beams, designated beam B, has a major lobe 12 substantially equal in magnitude to that of beam A and displaced to the right of boresight 18 by an amount substantially equal to the leftward displacement of beam A. Beam A and beam B define an area of overlap 13 which may be designated the "effective interrogation area."

In explaining the operation of this system, a simple and typical interrogation signal as shown in FIGURE 2 will be assumed. Such a signal includes a pair of pulses A and B. Pulse A is transmitted at time $t_1$ and pulse B is transmitted at a subsequent time $t_2$. A predetermined interval of time $\Delta t$ separates $t_1$ and $t_2$. Only those transponders receiving both pulse A and pulse B in their proper amplitude and time relationship will transmit the desired response signal back to the interrogator.

According to the teachings of this invention, pulse A will be transmitted on beam A only and, $\Delta t$ later, pulse B will be transmitted on beam B only. It is apparent that only those transponders situated within effective interrogation area 13 will receive both of pulses A and B; a transponder situated within the remainder of beam A will receive pulse A only, while a transponder situated within the remainder of beam B will receive pulse B only. Accordingly, only those transponders situated within effective interrogation area 13 will be activated to transmit a response signal responsive to the interrogation signal.

R–F radiator 10 may comprise a separate pair of directional antennas appropriately oriented to provide the necessary divergence between beam A and beam B. Alternatively, radiator 10 may comprise a single antenna combined with a suitable phasing array to provide a pair of major lobes, each of which diverges from the boresight of the antenna. An example of a radiator of this latter type includes sixteen equally-spaced quarter wave stubs with a reflector element. This antenna is fed by a suitable phasing array, indicated generally at 21, to provide the desired dual-beam output.

Although separate transmitters can be provided to furnish the R–F energy for each of beam A and beam B, in the interest of economy a single transmitter 14 in combination with suitable switching apparatus may be used to provide the required signals for the two beams. The requisite number and timing of pulses of the interrogation signal is generated by coder 23 in response to a sync signal. Coder output goes to modulator 22, which functions to key transmitter 14 according to the number and spacing of pulses in the interrogation signal. The output of coder 23 also passes to electronic switch 15, which functions to switch the output of transmitter 14 between the antenna for beam A and the antenna for beam B, or between the inputs to phasing array 21 which will cause a single antenna to radiate, respectively, beam A and beam B. Thus, switch 15 will cause R–F energy corresponding to pulse A to pass, for example, through conventional T–R switch 16 to phasing array 21 whereby beam A will be radiated and, time $\Delta t$ later, R–F energy corresponding to pulse B will be passed by switch 15 to conventional T–R switch 17 and then on to phasing array 21 whereupon beam B will be radiated.

In the receive mode of operation, inputs from both beam A and beam B pass through their respective T–R switches to receiver 24. The output of receiver 24 consists of two signals which form, respectively, the sum and the difference of the received signals from beam A and beam B. These sum and difference signals then pass to boresight detector 25 which is responsive to produce an output at 26 only when, within design tolerance, the sum signal from the receiver is at the noise level of the receiver. Thus, boresight detector 25 will produce an output only when there is received a response signal whose beam A magnitude and beam B magnitude are nearly equal. This means that the transponder producing such a response signal must be vary nearly located on boresight 18 of radiator 10.

As an example of a synthentic beam sharpening system, in accordance with the foregoing techings, consider an antenna having sixteen equally spaced quarter-wave stubs with a reflector element. Such an antenna has an aperture of approximately ten feet at an operating frequency of around 1,000 megacycles and has a beam width of about seven degrees with a side lobe level of −23 $db$. This antenna is fed at two points through a suitable phasing array to generate major lobe 11 and 12, corresponding to beam A and beam B, which lobes overlap at approximately the −3 db points thereof. The resulting beam width of the effective interrogation area is approximately two degrees. Of course, it will be understood that this is merely exemplary of one configuration of the beam sharpening system according to the teachings of this invention. The extent of the effective interrogation area can be changed, for example, by changing the angular relationship between beam A and beam B, or by varying either or both of the shapes of major lobes 11 and 12, or by both of these expedients.

If it is desired to utilize an interrogation signal comprising three or more pulses, the division of these pulses as between beam A and beam B is unimportant so long as at least one of such pulses is transmitted over beam A only and at least another of such pulses is transmitted over beam B only.

Although the examples set forth herein utilize sequential transmission of pulses, the same system of overlapping beams could also be used with simultaneous pulse transmission in an application not having the pulse separation requirements of the usual IFF system. In such an application the pulses would have to be distinguishable by some characteristic thereof, such as frequency, modulation, or the like.

It should be understood, of course, that the foregoing disclosure relates to only a preferred embodiment of the invention and that numerous modifications or alterations be made therein without departing from the spirit and the scope of the invention as set forth in the appended claims.

What is claimed is:
1. Apparatus for producing a synthetically sharpened beam for an electronic interrogation system, comprising:
   R-F radiator means capable of producing a first beam and a second beam, each of said beams diverging from the boresight of the radiator means by a predetermined degree, said beams being spatially oriented so that there exists a region capable of being covered by each of said beams;
   a source of R-F energy;
   interrogation signal generating means connected to said source of R-F energy to cause said source to be operative in response to a signal produced by said interrogation signal generating means;
   switch means receiving the output from said R-F source and also receiving the output from said interrogation signal generating means, said switch means having a first output and a second output and connecting the output from said R-F source to either of said first and second outputs in response to a corresponding signal received from said interrogation signal generating means; and
   means connecting each of said switch means outputs to said R-F radiator means so that an R-F signal appearing at said first switch output causes generation of said first beam and an R-F signal appearing at said second switch output causes generation of said second beam.

2. The method of performing an IFF interrogation to investigate and identify objects in a selected narrow region, comprising the steps of:
   transmitting one portion of the interrogation signal on a first beam having a major lobe of radiated energy;
   transmitting another portion of the interrogation signal on a second beam having a major lobe of radiated energy;
   causing a segment of the major lobe of said second beam to be coextensive with a segment of the major lobe of said first beam so that both of said portions of the interrogation signal can be received only in the region where said beam segments are coextensive;
   transmitting a response signal from a transponder situated in said coextensive region and receiving both of said portions of the interrogation signal; and
   receiving said response signal.

3. The method of locating and identifying unknown objects in a selected region, comprising the steps of:
   equipping the unknown objects with transponders capable of transmitting a known reply signal only in response to reception of a predetermined interrogation signal;
   transmitting one portion of said interrogation signal on a first beam having a major lobe of radiated energy;
   transmitting another portion of said interrogation signal on a second beam having a major lobe of radiated energy;
   causing a segment of the major lobe of said second beam to be coextensive with a segment of the major lobe of said first beam so that a transponder can receive both portions of said interrogation signal only when the unknown object is located in the region where said beam segments are coextensive; and
   listening for a response signal transmitted by a transponder associated with an object located in said coextensive region and receiving both portions of said interrogation signal.

4. Apparatus as in claim 1, further comprising:
   R-F receiver means selectively connected to said R-F radiator means to receive a signal transmitted in response to an interrogation signal transmitted over said first and second beams;
   said interrogation signal generating means operating said source of R-F energy and said switch means to produce periodic interrogation pulses each of which includes a first portion transmitted on said first beam and a second portion transmitted on said second beam; and
   said interrogation signal generating means additionally being operative to produce between each of said periodic interrogation pulses a quiet period wherein said R-F receiver means is operative.

References Cited
UNITED STATES PATENTS

| | | | |
|---|---|---|---|
| 1,821,921 | 9/1931 | Bangay | 343—100.4 |
| 2,039,812 | 5/1936 | Leib et al. | 343—110 |
| 2,176,469 | 10/1939 | Moueix | 343—110 |
| 2,187,097 | 1/1940 | Pope | 343—110 |
| 2,238,107 | 4/1941 | Furnival et al. | 343—110 |
| 2,459,457 | 1/1949 | Sanders | 343—16.2 |
| 2,540,087 | 2/1951 | Barchok et al. | 343—6.5 |
| 2,554,893 | 5/1951 | Brunn | 343—6.5 |
| 2,664,561 | 12/1953 | McIlwain | 343—6.5 |

RODNEY D. BENNETT, Jr., *Primary Examiner.*

JEFFREY P. MORRIS, *Assistant Examiner.*

U.S. Cl. X.R.

343—16